United States Patent
Ghosh et al.

(10) Patent No.: US 10,308,559 B2
(45) Date of Patent: Jun. 4, 2019

(54) SINTERED POLYCRYSTALLINE CUBIC BORON NITRIDE BODY

(71) Applicant: Element Six (UK) Limited, Oxfordshire (GB)

(72) Inventors: Santonu Ghosh, Oxfordshire (GB); Martin Ryan Gardener, Oxfordshire (GB)

(73) Assignee: Element Six (UK) Limited (GB)

(*) Notice: Subject to any disclaimer, the term of this patent is extended or adjusted under 35 U.S.C. 154(b) by 0 days.

(21) Appl. No.: 15/569,109

(22) PCT Filed: Apr. 22, 2016

(86) PCT No.: PCT/EP2016/059035
§ 371 (c)(1),
(2) Date: Oct. 25, 2017

(87) PCT Pub. No.: WO2016/173946
PCT Pub. Date: Nov. 3, 2016

(65) Prior Publication Data
US 2018/0118628 A1    May 3, 2018

(30) Foreign Application Priority Data
Apr. 27, 2015    (GB) .................. 1507110.3

(51) Int. Cl.
*C04B 35/58*    (2006.01)
*C04B 35/5831*    (2006.01)
(Continued)

(52) U.S. Cl.
CPC ............ *C04B 35/5831* (2013.01); *B22F 3/14* (2013.01); *B22F 5/00* (2013.01); *C04B 35/117* (2013.01);
(Continued)

(58) Field of Classification Search
USPC .............. 428/325, 698, 701, 704; 501/96.4; 51/295, 296, 307, 309
See application file for complete search history.

(56) References Cited

U.S. PATENT DOCUMENTS 3,743,489 A    7/1973    Wentorf, Jr. et al.
3,745,623 A    7/1973    Wentorf, Jr. et al.
(Continued)

FOREIGN PATENT DOCUMENTS

CN    103667772 A    3/2014
CN    103695748 A    4/2014
(Continued)

OTHER PUBLICATIONS

Wu et al "Bio-inspired surface engineering and tribology of MoS2 overcoated cBN—TiN composite coatings" Wear 261 (2006) p. 592-599. (Year: 2006).*
(Continued)

*Primary Examiner* — Archene A Turner
(74) *Attorney, Agent, or Firm* — Armstrong Teasdale LLP

(57) ABSTRACT

A sintered polycrystalline body and a method of forming the sintered polycrystalline body are disclosed. The sintered polycrystalline body comprises a plurality of particles cubic boron nitride dispersed in a matrix. The matrix includes materials selected from compounds of any of titanium and aluminium. The polycrystalline body further comprises 0.1 to 5.0 volume % of lubricating chalcogenide particles dispersed in the matrix. The chalcogenide particles have a coefficient of friction of less than 0.1 with respect to a workpiece material. Preferably sulfide particles are used as lubricant. Preferably 30-70 vol.-% cBN is contained. Sintering takes place at 1100-1600° C. and 4-8 GPa.

10 Claims, 5 Drawing Sheets

(51) Int. Cl.
- *B22F 3/14* (2006.01)
- *C04B 35/117* (2006.01)
- *C04B 35/56* (2006.01)
- *C04B 35/581* (2006.01)
- *C04B 35/645* (2006.01)
- *C22C 26/00* (2006.01)
- *C04B 35/63* (2006.01)
- *B22F 5/00* (2006.01)
- *C04B 37/00* (2006.01)
- *C22C 29/16* (2006.01)

(52) U.S. Cl.
CPC ........ *C04B 35/5611* (2013.01); *C04B 35/581* (2013.01); *C04B 35/58014* (2013.01); *C04B 35/58021* (2013.01); *C04B 35/58071* (2013.01); *C04B 35/6303* (2013.01); *C04B 35/645* (2013.01); *C04B 37/001* (2013.01); *C22C 26/00* (2013.01); *C22C 29/16* (2013.01); *B22F 2005/001* (2013.01); *B22F 2302/20* (2013.01); *C04B 2235/3217* (2013.01); *C04B 2235/3251* (2013.01); *C04B 2235/3256* (2013.01); *C04B 2235/3258* (2013.01); *C04B 2235/386* (2013.01); *C04B 2235/3813* (2013.01); *C04B 2235/3843* (2013.01); *C04B 2235/3856* (2013.01); *C04B 2235/3865* (2013.01); *C04B 2235/3886* (2013.01); *C04B 2235/3895* (2013.01); *C04B 2235/446* (2013.01); *C04B 2235/5409* (2013.01); *C04B 2235/5436* (2013.01); *C04B 2235/5445* (2013.01); *C04B 2235/5463* (2013.01); *C04B 2235/5472* (2013.01); *C04B 2235/77* (2013.01); *C04B 2235/80* (2013.01); *C04B 2237/36* (2013.01); *C04B 2237/361* (2013.01)

(56) References Cited

U.S. PATENT DOCUMENTS

| | | | |
|---|---|---|---|
| 3,767,371 A | 10/1973 | Wentorf, Jr. et al. | |
| 4,157,897 A * | 6/1979 | Keat | B24D 3/16 51/295 |
| 4,334,928 A | 6/1982 | Hara et al. | |
| 4,378,233 A | 3/1983 | Carver | |
| 4,694,918 A | 9/1987 | Hall | |
| 5,328,875 A | 7/1994 | Ueda et al. | |
| 5,466,642 A | 11/1995 | Tajima et al. | |
| 5,472,461 A * | 12/1995 | Li | B24D 3/14 51/307 |
| 8,034,153 B2 * | 10/2011 | Marchiando | B22F 3/115 501/96.4 |
| 2005/0181715 A1 * | 8/2005 | Galen | B24D 3/20 451/540 |
| 2008/0209818 A1 | 9/2008 | Belnap et al. | |
| 2009/0084042 A1 * | 4/2009 | Ramanath | B24D 3/10 51/309 |
| 2010/0313489 A1 | 12/2010 | Teramoto et al. | |
| 2012/0208006 A1 | 8/2012 | Okamura et al. | |
| 2012/0304544 A1 | 12/2012 | Yokoshi | |

FOREIGN PATENT DOCUMENTS

| | | | |
|---|---|---|---|
| EP | 0629472 A1 | | 12/1994 |
| EP | 0857552 A2 | | 8/1998 |
| GB | 1296589 | * | 11/1972 |
| RU | 2482207 C1 | | 5/2013 |
| SU | 921832 A | | 4/1982 |

OTHER PUBLICATIONS

Artamonov et al., "Lubricating properties of molybdenum and Tungsten Disulfides," Soviet Powder Metallurgy and Metal Ceramics, 7(12): 972-976 (1968).

International Search Report and Written Opinion issued for PCT/EP2016/059035 dated Jul. 21, 2016 (10 pages).

* cited by examiner

SINTERED POLYCRYSTALLINE CUBIC BORON NITRIDE BODY

CROSS-REFERENCE TO RELATED APPLICATIONS

This application is a National Stage of International Application No. PCT/EP2016/059035, filed Apr. 22, 2016, which claims priority to GB1507110.3, filed Apr. 27, 2015.

FIELD

The invention relates to the field of sintered polycrystalline bodies, and in particular to sintered polycrystalline bodies that have grains of a superhard material dispersed in a matrix.

BACKGROUND

Polycrystalline super hard materials, such as polycrystalline diamond (PCD) and polycrystalline cubic boron nitride (PCBN) may be used in a wide variety of tools for cutting, machining, drilling or degrading hard or abrasive materials such as rock, metal, ceramics, composites and wood-containing materials.

Abrasive compacts are used extensively in cutting, milling, grinding, drilling and other abrasive operations. They generally contain ultrahard abrasive particles dispersed in a second phase matrix. The matrix may be metallic or ceramic or a cermet. The ultrahard abrasive particles may be diamond, cubic boron nitride (cBN), silicon carbide or silicon nitride and the like. These particles may be bonded to each other during the high pressure and high temperature compact manufacturing process generally used, forming a polycrystalline mass, or may be bonded via the matrix of second phase material(s) to form a sintered polycrystalline body. Such bodies are generally known as polycrystalline diamond or polycrystalline cubic boron nitride, where they contain diamond or cBN as the ultrahard abrasive, respectively. Examples of diamond and cubic boron nitride abrasive compacts are described in U.S. Pat Nos. 3,745,623; 3,767,371; 3,743,489; 4,334,928; 5,466,642 and 5,328,875.

For example, U.S. Pat. No 4,334,928 teaches a sintered compact for use in a tool consisting essentially of 20 to 80 volume % of cubic boron nitride; and the balance being a matrix of at least one binder compound material selected from the group consisting of a carbide, a nitride, a carbonitride, a boride and a suicide of a IVa or a Va transition metal of the periodic table, mixtures thereof and their solid solution compounds. The matrix forms a continuous bonding structure in a sintered body with the high pressure boron nitride interspersed within a continuous matrix. The methods outlined in this patent all involve combining the desired materials using mechanical milling/mixing techniques such as ball milling, mortars and the like.

Sintered polycrystalline bodies may be 'backed' by forming them on a substrate. Cemented tungsten carbide, which may be used to form a suitable substrate, is formed from carbide particles dispersed, for example, in a cobalt matrix by mixing tungsten carbide particles/grains and cobalt together then heating to solidify. To form the cutting element with an ultra-hard material layer such as PCD or PCBN, diamond particles or grains or CBN grains are placed adjacent the cemented tungsten carbide body in a refractory metal enclosure such as a niobium enclosure and are subjected to high pressure and high temperature so that inter-grain bonding between the diamond grains or CBN grains occurs, forming a polycrystalline super hard diamond or polycrystalline CBN layer.

In some instances, the substrate may be fully cured prior to attachment to the ultra-hard material layer whereas in other cases, the substrate may be green (not fully cured). In the latter case, the substrate may fully cure during the HTHP sintering process. The substrate may be in powder form and may solidify during the sintering process used to sinter the ultra-hard material layer.

Polycrystalline super hard materials, such as polycrystalline diamond (PCD) and PCBN may be used in a wide variety of tools for cutting, machining, drilling or degrading hard or abrasive materials such as rock, metal, ceramics, composites and wood-containing materials. A sintered polycrystalline body may be used as a tool insert to form an abrasive or cutting edge.

During a machining operation, tool inserts are susceptible to higher friction, which leads to increased flank wear, and higher temperatures, which lead to increased chemical wear, thereby shortening the tool life. The working life of tool inserts may be limited by fracture of the super hard material, including by spalling and chipping, or by wear of the tool insert. In many of these applications, the temperature of the superhard material may become elevated as it engages workpieces or other bodies. Mechanical properties of superhard material such as abrasion resistance, hardness and strength tend to deteriorate at elevated temperatures. In order to address this, a solid or liquid lubricant is provided during a machining operation (such as turning or milling) to reduce friction between the tool insert and the workpiece. FIG. 1 shows an example where a tool 1 comprises a tool insert 2. During a machining operation the tool insert 2 contacts a workpiece 3. Solid lubricant particles 4 are sprayed onto the cutting area to reduce friction between the tool insert 2 and the workpiece 3.

SUMMARY

In some circumstances, the provision of a lubricant during a machining operation is not practical. Alternatively, when a lubricant can be added, it may provide insufficient lubrication. It is an object to improve lubrication for a tool insert made from a plurality of superhard material grains dispersed in a matrix during a machining operation.

According to a first aspect, there is provided a sintered polycrystalline body comprising a plurality of particles cubic boron nitride dispersed in a matrix. The matrix includes materials selected from compounds of any of titanium and aluminium. The polycrystalline body comprises 0.1 to 5.0 volume % of lubricating chalcogenide particles dispersed in the matrix. The chalcogenide particles have a coefficient of friction of less than 0.1 with respect to a workpiece material. An advantage of this is that when the polycrystalline sintered body is used in a machining application, the chalcogenide particles lower friction between polycrystalline sintered body and the workpiece, thereby improving the tool life of the polycrystalline sintered body.

As an option, the sintered polycrystalline body comprises from 30 to 70 volume % cubic boron nitride.

The chalcogenide particles optionally comprise tungsten disulphide and the cutting workpiece material comprises a ferrous material.

The chalcogenide particles optionally comprise any of tungsten disulphide, tantalum disulphide and molybdenum disulphide.

As a further option, the matrix comprises further particles comprising any of titanium carbonitride, titanium carbide, titanium nitride, titanium diboride, aluminium nitride and aluminium oxide.

The sintered polycrystalline body optionally comprises a substrate, wherein the matrix material is bonded to the substrate along an interface. The substrate is optionally formed of tungsten carbide.

As a further option, the sintered polycrystalline body further comprises $Ti_2CS$.

According to a second aspect, there is provided a method of making a sintered polycrystalline body. A plurality of particles of cubic boron nitride is mixed with a matrix precursor material. The matrix precursor material comprises compounds of any of titanium and aluminium, and further comprises chalcogenide particles formed of a material having a coefficient of friction of less than 0.1 with respect to a cutting workpiece material, wherein those particles form 0.1 to 5.0 volume % of the combined superhard material particles and the matrix precursor material particles. The plurality of particles of cubic boron nitride and the particles of matrix precursor material are consolidated and sintered at a pressure of between 4 GPa and 8 GPa and a temperature of between 1100° and 1600° C.

As an option, the method comprises consolidating and sintering the plurality of particles of superhard material and the particles of matrix precursor material at a pressure of between 4 GPa and 6 GPa and a temperature of between 1200° and 1450° C.

As an option, the cubic boron nitride in the range of 30 to 70 volume %.

As a further option, the chalcogenide particles having a coefficient of friction of less than 0.1 with respect to the cutting workpiece comprise tungsten disulphide and the cutting workpiece material comprises a ferrous material.

As an option, the chalcogenide particles having a coefficient of friction of less than 0.1 with respect to the cutting workpiece comprise any of tungsten disulphide, tantalum disulphide and molybdenum disulphide.

The matrix optionally further comprises materials selected from compounds of any of titanium and aluminium. As a further option, the matrix comprises particles comprising any of titanium carbonitride, titanium carbide, titanium nitride, titanium diboride, aluminium nitride and aluminium oxide.

The method optionally further comprises providing a substrate precursor material, and consolidating and sintering the plurality of particles of cubic boron nitride and the particles of matrix precursor material onto the substrate precursor material, thereby forming a sintered polycrystalline body bonded to a substrate along an interface. The substrate is optionally formed of tungsten carbide.

According to a third aspect, there is provided a tool comprising a sintered polycrystalline body as described above in the first aspect, the tool being for any of cutting, milling, grinding, drilling, or other abrasive applications.

BRIEF DESCRIPTION OF DRAWINGS

Non-limiting embodiments will now be described by way of example and with reference to the accompanying drawings in which.

DETAILED DESCRIPTION

Figure 1:
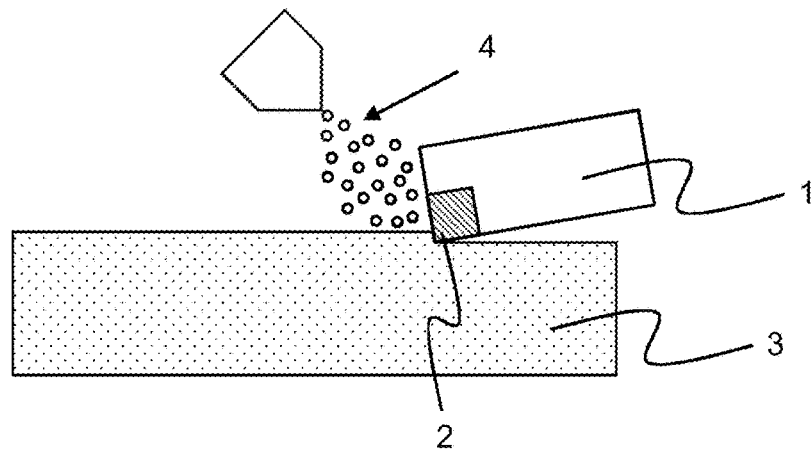
FIG. 1 illustrates schematically a machining operation using a solid lubricant.
Figure 2:
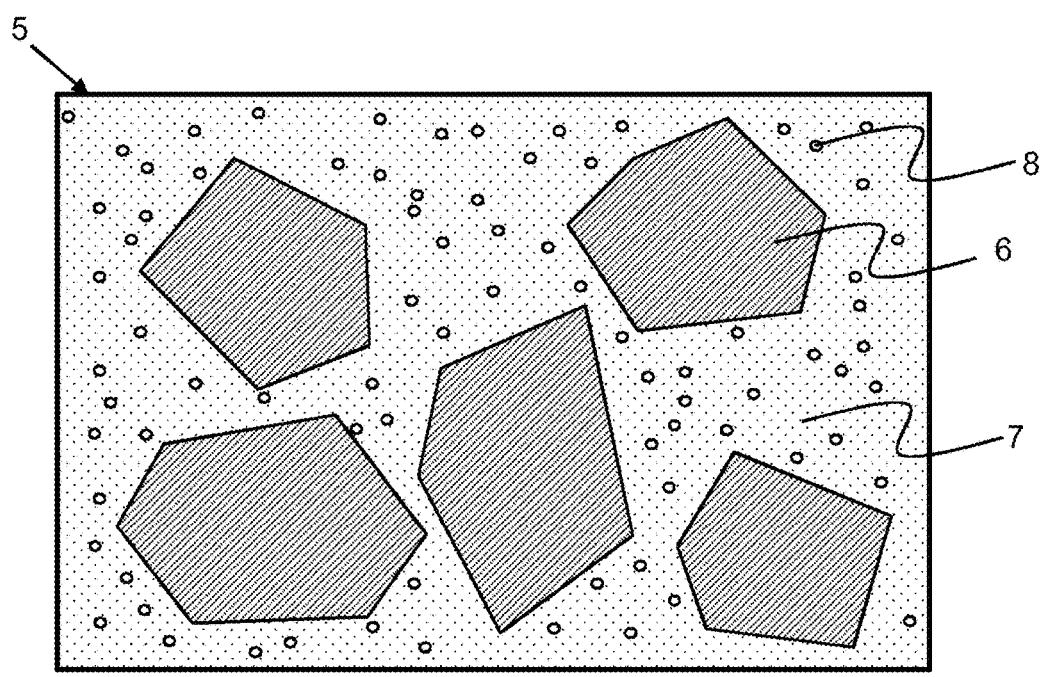
FIG. 2 illustrates schematically an exemplary sintered polycrystalline body microstructure.

With reference to FIG. 2, a schematic microstructure of a sintered polycrystalline body 5 is shown. The body comprises a plurality of grains of a superhard material 6, such as cubic boron nitride, dispersed in a matrix 7. In addition, particles 8 are also dispersed in the matrix 7. The material selection of the particles 8 is made depending on the intended workpiece to be cut by a tool made from the sintered polycrystalline body 5. The co-efficient of friction between the particles 8 and the workpiece is selected to be as low as possible. Other factors that may be taken into account when selecting the particles 8 include thermal stability and load bearing capacity, depending on the types of conditions expected during a machining operation. It will be appreciated that other types of lubricating particle may be used. For example hexagonal boron nitride, graphite and graphene all have a suitably low co-efficient of friction. However, it is thought that their stability is not adequate at the expected use temperature of a machining tool made from a sintered polycrystalline body. Other potential lubricating materials include soft metals such as lead, indium, silver or tin, some polymers such as PTFE or some rare-earth fluorides.

Typical lubricating materials for the particles 8 are layered structures having covalently bonded atoms with a two-dimensional layer only a few atoms thick with multiple layers held together in a stack by weaker van der Waals forces. Transition metal di-chalcogenides such as molybdenum disulphide, tungsten disulphide or tantalum disulphide can be used. Furthermore, exfoliated forms of any of the above materials may be used.

The disulphide materials are particularly useful under aggressive conditions due to their resistance to heat and oxidation. The accepted mechanism of lubrication is thought to be due to the lamellar structure orienting itself parallel to the sliding surfaces resulting in high bearing load and low shear stress. Note that any type of chalcogenide particle that has a suitably low co-efficient of friction with respect to the workpiece may be used. A chalcogenide is a chemical compound consisting of at least one chalcogen anion and at least one more electropositive element. The term chalcogenide is more commonly reserved for sulphides, selenides, and tellurides, rather than oxides. As used herein, the term chalcogenide refers to sulphides, selenides and tellurides.

While the main intended use is for sintered polycrystalline bodies comprising cubic boron nitride (cBN) as the superhard material, it will be appreciated that other super-hard materials, such as diamond, may be used. Where the intended workpiece is ferrous, cBN is used and diamond is not stable at high temperatures when cutting ferrous materials. Where the polycrystalline sintered body uses cBN as the superhard material, $WS_2$ is a suitable material for the lubricating particles as it is stable in a temperature range of −270° C. to 650° C., has a load bearing capacity of 2 GPa, and has a co-efficient of friction (μ) of 0.03 with respect to steel. Exemplary values for co-efficient of friction for $WS_2$ and $MoS_2$ can be found in Artamonov et. al., "Lubricating properties of molybdenum and tungsten disulfides", Soviet Powder Metallurgy and Metal Ceramics, 1968, Volume 7, Issue 12, pp 972-976.

The polycrystalline sintered body 5 may be formed on a substrate. The substrate may be formed of, for example, cemented carbide material and may be, for example, cemented tungsten carbide, cemented tantalum carbide, cemented titanium carbide, cemented molybdenum carbide or mixtures thereof.

Figure 3:
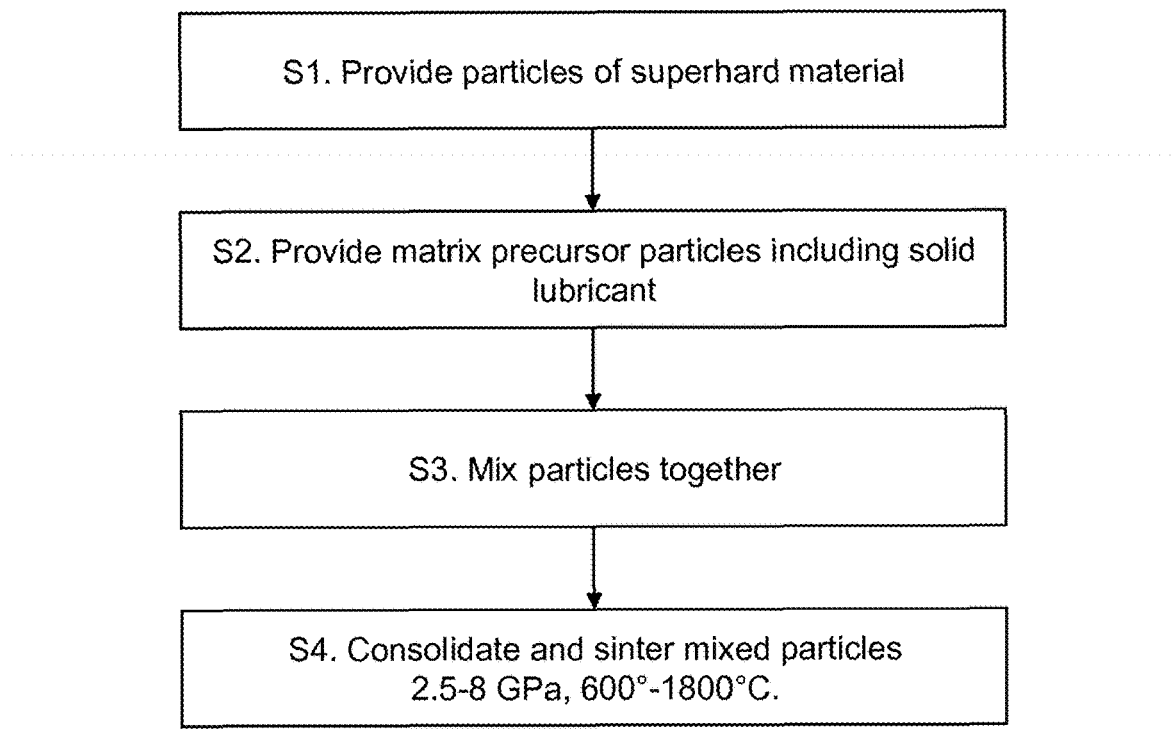
FIG. 3 is a flow diagram showing exemplary steps in preparing a sintered polycrystalline body.

FIG. 3 is a flow diagram showing exemplary steps in forming a sintered polycrystalline body as illustrated in FIG. 2. The following numbering corresponds to that of FIG. 3:

S1. Particles of a superhard material such as cBN are provided.

S2. Particles of matrix precursor materials including compounds of titanium and/or aluminium are provided. The matrix precursor includes 0.1 to 5.0 volume % of lubricating chalcogenide particles, wherein the chalcogenide particles material has a coefficient of friction of less than 0.1 with respect to a cutting workpiece material.

S3. The superhard material and the matrix precursor material are mixed together to form an intimate mixture.

S4. The mixed particles are consolidated and sintered at a pressure of between 4 GPa and 8 GPa and a temperature of between 1100° and 1600° C. to form a polycrystalline sintered body.

Note that the above method can also be modified to provide a sintered polycrystalline body bonded to a substrate. This can be done either by including a substrate precursor material and forming the polycrystalline body in a single step (S4). Alternatively, the substrate can be pre-formed and the sintered particles of matrix precursor and superhard particles can be sintered onto the pre-formed substrate (S4).

The resultant polycrystalline sintered body can be thought of as 'self-lubricating' as, during a machining operation, chalcogenide particles in the matrix lubricate the region between the workpiece being machined and the tool that comprises the polycrystalline sintered body as a cutting or abrasive edge. Note that this lubrication may be instead of or in addition to another form of lubrication, such as spraying a solid or liquid lubricant onto the cutting surface.

EXAMPLES

Figure 4:
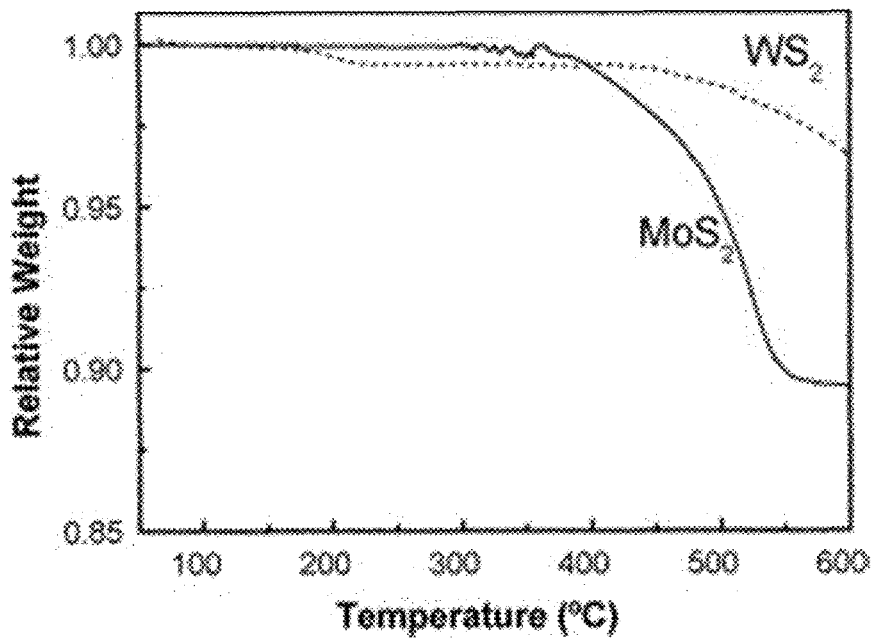
FIG. 4 is a graph comparing dissociation with respect to temperature of tungsten disulphide and molybdenum disulphide.

Tungsten disulphide remains stable in the temperature range of −270° C. to 650° C. and has a load bearing capacity of 2 GPa, which is within the limit of the pressure at a tool tip during a continuous turning operation. The following examples therefore use tungsten disulphide as the lubricating material in a polycrystalline cubic boron nitride (PCBN) sintered material, although it will be appreciated that other lubricating materials may be more suitable for other types of operation. By way of example, FIG. 4 shows the dissociation behaviour of tungsten disulphide and molybdenum disulphide as a function of temperature.

Production

It was considered that three important factors in achieving effective solid lubrication of the polycrystalline sintered body are:

1. Dispersion of the lubricant: In order to address this, powder was dispersed using attrition milling. Tungsten disulphide was added during the first step of a milling stage of the PCBN pre-synthesis to achieve a good dispersion of tungsten disulphide in the PCBN matrix precursor material. In this example, milling was performed by attrition milling.

2. Achieve better green compaction: It was found that, owing to the lubricating properties of the tungsten disulphide, the powder could be compacted quicker compared to a standard PCBN powder with no tungsten disulphide added.

3. Resist dissociation at high temperature: In order to reduce the degree of dissociation of the tungsten disulphide during the high pressure high temperature (HPHT) sintering, a shorter sintering time would be required.

Three different compositions were prepared for carrying turning machining tests to establish the effectiveness of the solid lubricant, as shown in Table 1. Example 4 was provided as a reference sample with no solid lubricant added.

TABLE 1

| Example | $WS_2$ (Vol. %) | Precursor materials |
| --- | --- | --- |
| 1 | 5 | 55% Volume % CBN with average grain size of ~0.8 μm, with TiCN/Al |
| 2 | 1 | 55% Volume % CBN with average grain size of ~0.8 μm, with $(TiC_{0.5}N_{0.5})_{0.8}$/Al |
| 3 | 1 | 55% Volume % CBN with average grain size of ~0.8 μm, with $(TiC_{0.3}N_{0.7})_{0.8}$/Al |
| 4 | 0 | 55% Volume % CBN with average grain size of ~0.8 μm, with TiCN/Al |

The example powders were sintered at high pressure (around 4.8 to 5.0 GPa) and high temperature (1300-1400° C.) in two different formats, 16.5 mm and 58 mm disc format. The polycrystalline sintered bodies in all examples were formed without a substrate. The matrix material for all of the PCBN polycrystalline sintered bodies was essentially a ceramic material comprising compounds of titanium and aluminium. It is known to use metallic binders rather than ceramic binders (in this case, carbide, nitrides and/or carbonitrides). During a machining operation, a metallic binder tends to smear as it is more ductile than ceramic binder. As the ceramic binder does not display similar ductility to metallic binders, it was initially expected that the addition of $WS_2$ would not show significant lubricating properties, because the $WS_2$ is fixed in the matrix and cannot move (unlike with a metallic binder). Surprisingly, this was not the case and the $WS_2$ provided improved performance, as described below.

Material Characterization

Oxygen content as well as pick up of different impurities in the PCBN tool have an effect on wear properties as well as mechanical properties of the material. Both mechanical and powder characterization was performed to compare properties of the concepts Table 2 gives characterization data of the powders before sintering, where d(0.1) denotes the diameter of the smallest 10% of particles, d(0.5) denotes the diameter of the smallest 50% of particles and d(0.9) denotes the diameter of the smallest 90% of the particles, as measured by a Mastersizer laser instrument:

TABLE 2

| Example | d(0.1) μm | d(0.5) μm | d(0.9) μm | Oxygen (%) | SSA (m²/g) | WC pick up (%) |
|---|---|---|---|---|---|---|
| 1 | 0.645 | 1.756 | 4.109 | 3.81 ± 1 | 15.09 | 6.1 |
| 2 | 0.512 | 1.414 | 3.306 | 4.25 ± 0.1 | 13.66 | 5.9 |
| 4 |  | 1.501 | 3.452 | 4.93 ± 0.2 | 16.9 | 5.6 |

The powders all show similar oxygen and WC pick up. It is known that an oxygen content greater than around 5 weight % and a WC pick up of greater than 6 weight % can have a negative impact on tool performance.

Figure 5:
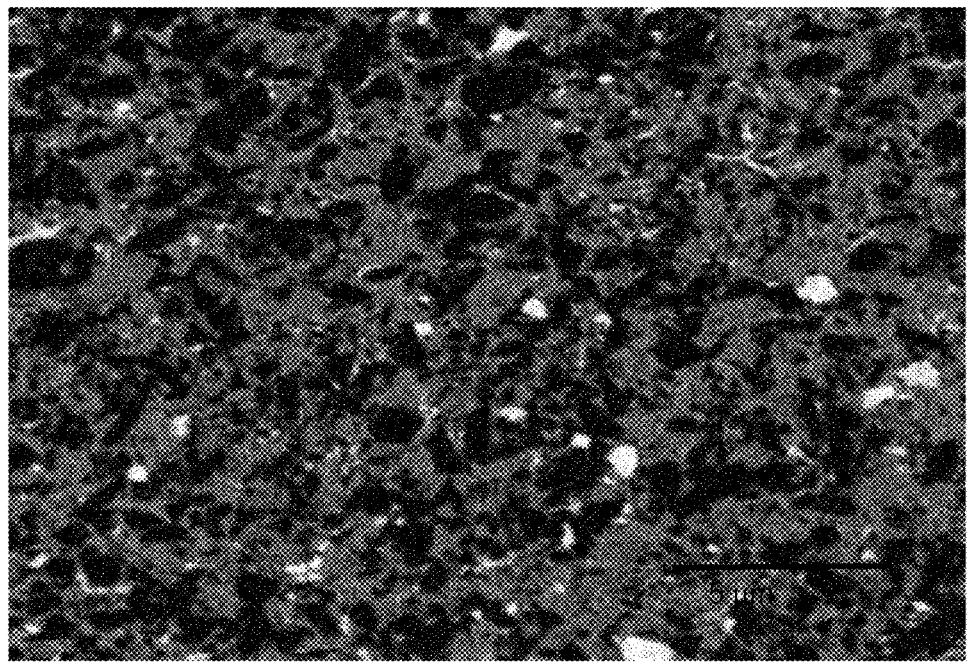
FIG. 5 is an exemplary SEM micrograph of a sintered body.
Figure 6:
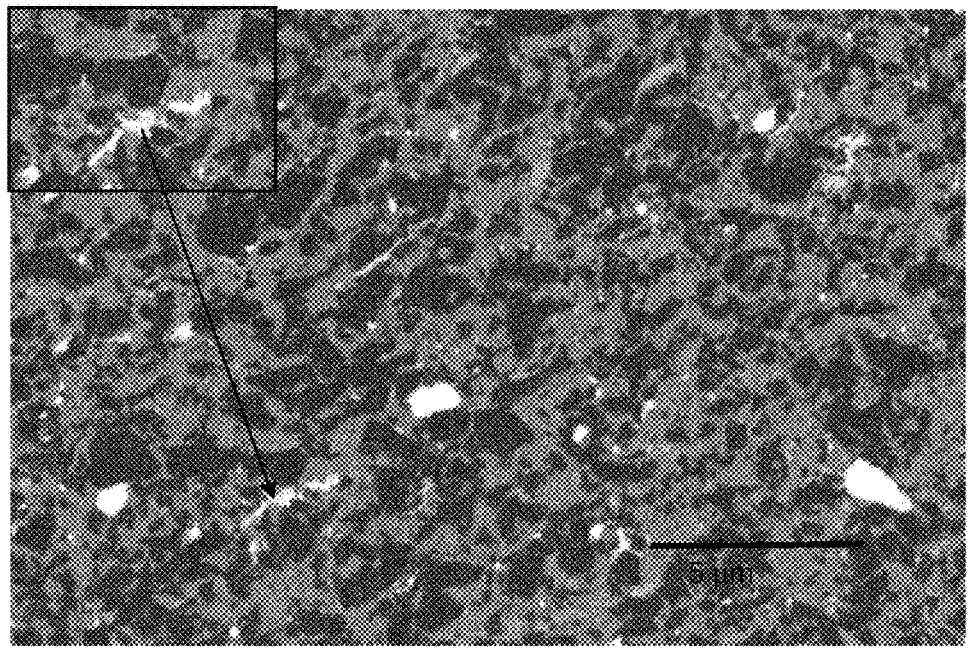
FIG. 6 is a further exemplary micrograph of a sintered body.

The morphology and distribution of $WS_2$ was studied through SEM. FIG. 5 is a micrograph obtained by scanning electron microscopy (SEM) on a polycrystalline body made from Example 1 with 5 vol % tungsten disulphide. Tungsten disulphide is shown as the palest phase, as determined by obtaining EDS spectra. FIG. 6 is an SEM micrograph of a sintered polycrystalline body obtained using Example 2 with 1 vol % tungsten disulphide.

It can be seen from FIGS. 5 and 6 that some of the tungsten disulphide forms an elongated structure, which may toughen the polycrystalline body by a crack deflection mechanism. The microstructures and XRD patterns shows that examples 1 to 3 have tube shaped tungsten disulphide, and the reference example 4 has a similar microstructure but without the presence of tungsten disulphide. An improved dispersion of the tube shaped solid lubricants was also observed. In summary, the materials could be sintered and tool could be prepared with desired properties Application Testing A tool was prepared with an insert geometry SNMN090308S01225. Three corners from three different inserts were tested in a continuous turning test. Table 3 summarizes the testing conditions:

TABLE 3

| Testing | H05 continuous turning test |
|---|---|
| Work piece material | SAE 8620 case hardened steel (60-64 HRC) |
| lathe | CTX500 |
| Force measurement | Kistler 3 axis force measurement kit |
| Cutting speed | 200 m/min |
| Feed | 0.1 mm/min |
| Depth of cut | 0.15 mm |
| Flank wear measurement | Vbmax |

Figure 7:
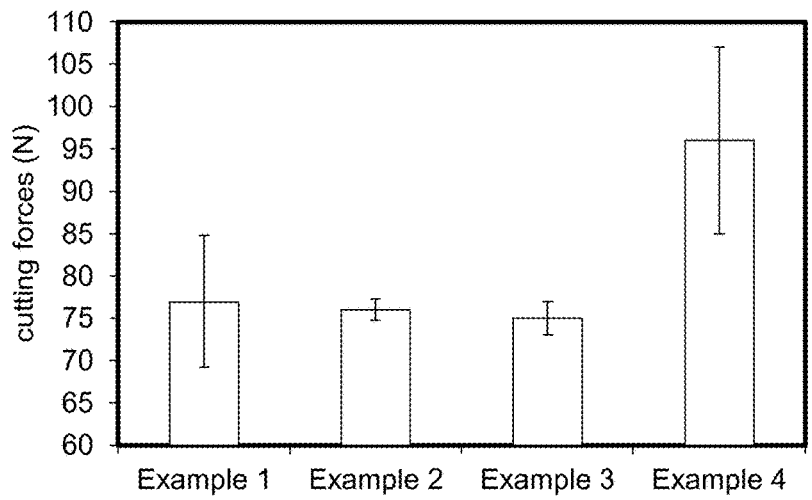
FIG. 7 is a graph of cutting forces for different materials.

FIG. 7 shows the average cutting forces for three corners. It can be seen that there is a significant drop in the cutting forces for examples 1 and 2 compared to the reference grade (example 4).

Although examples 1 and 2 showed a similar improvement in cutting performance in the screening process, example 1 (with 5 vol % tungsten disulphide) showed inferior wear properties compared to example 2, as show in table 4 below:

TABLE 4

| Example | Flank wear (mm) | Volume loss (μm³) | Crater depth (μm) |
|---|---|---|---|
| 1 | 0.073 | 443780 | 37.27 |
| 2 | 0.054 | 349692 | 27.15 |

Table 5 shows more detail for the flank wear and crater depth in microns for examples 3 and 4 after different numbers of passes.

TABLE 5

|  | 10 passes | 20 passes | 30 passes | 40 passes | 50 passes | 60 passes | 70 passes |
|---|---|---|---|---|---|---|---|
| Crater depth (μm) |  |  |  |  |  |  |  |
| Example 4 | 32.8 | 49.0 | 61.3 |  |  |  |  |
| Example 3 | 22.5 | 33.3 | 44.4 | 54.1 | 56.7 | 60.1 | 65.3 |
| Flank wear (μm) |  |  |  |  |  |  |  |
| Example 4 | 56.7 | 70.0 | 91.0 |  |  |  |  |
| Example 3 | 37.5 | 60.5 | 74.5 | 93 | 97 | 108 | 116 |

Examples 1 and 2 showed no improvement in the wear behaviour in the continuous turning test compared to the reference example 4. It may be that higher chemical wear in Example 1 (5 vol % $WS_2$) is related to the inferior resistance of PCBN containing higher amount of WS2.

A further benefit of providing particles of materials such as $WS_2$, $MoS_2$, hBN, graphite and graphene is that they tend to have a low coefficient of friction with respect to other materials in the matrix, in addition to having a low coefficient of friction with respect to a workpiece to be machined by a tool made from the sintered polycrystalline body. It has been found that the pre-sintered density of pressed compacts of matrix and cBN is improved when materials such as $WS_2$, $MoS_2$, hBN, graphite and graphene are included in the matrix.

For examples 1, 2 and 4, the maximum theoretical density of the powder (cBN and matrix) was calculated using the rule of mixtures. 1.88 grams of each powder was weighed into a niobium Nb canister. Loads were then applied to each sample and the dimensions of the resultant compact were measured to determine the density. These values were used to calculate the relative density as a percentage of the maximum theoretical density.

Figure 8:
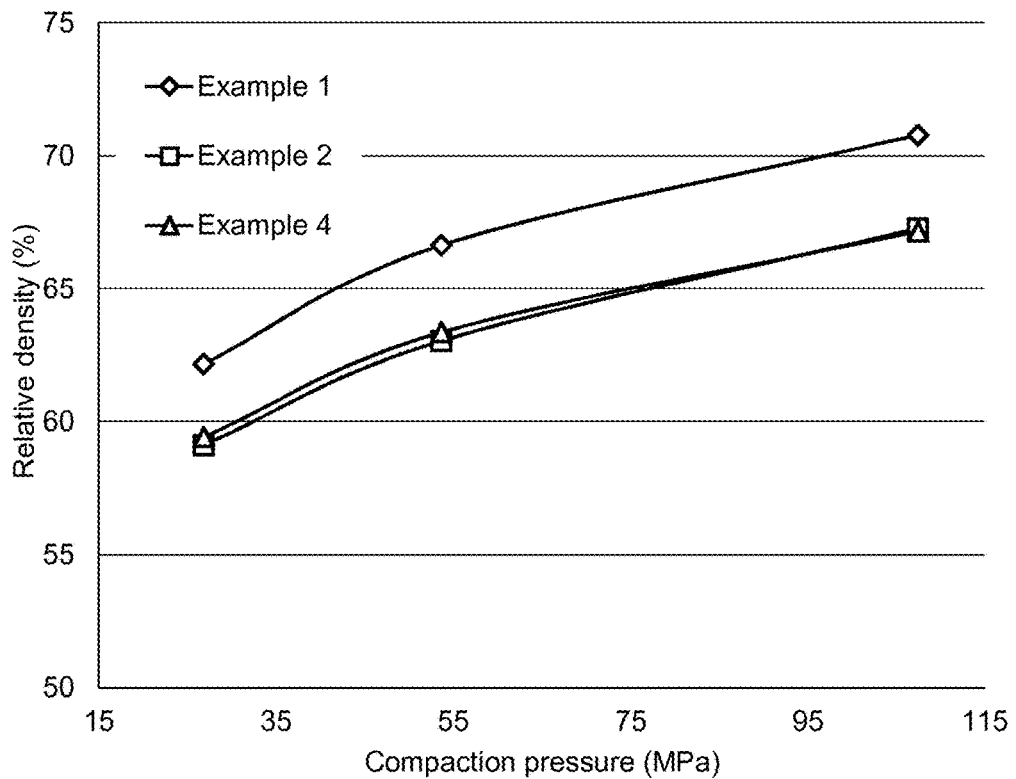
FIG. 8 is a graph of relative density against compaction pressure for samples having different solid lubricant contents.

FIG. 8 is a graph showing the relative density (as a % of the maximum theoretical density) of pre-sintered compacts against the compaction pressure. It can be seen that the addition of 1% $WS_2$ (example 2) had little effect on the relative density compared to example 4 (with no $WS_2$ added). However, the addition of 5% $WS_2$ gave a significant improvement in the density of the compacted powder. It is thought that the addition of $WS_2$ reduces the friction between cBN particles and particles in the matrix, which allows particles to slide over one another with less friction. This leads to a higher density for a given compaction pressure.

Figure 9:
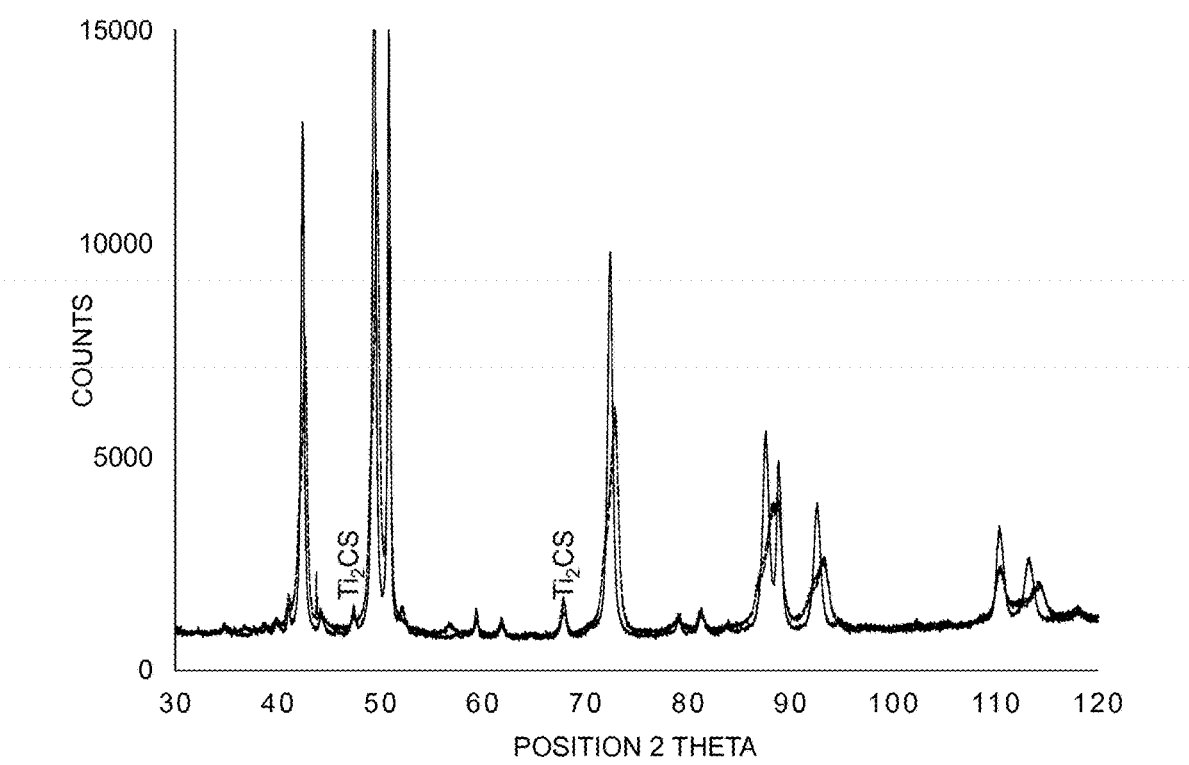
FIG. 9 is an X-Ray Diffraction trace of exemplary samples.

Turning now to FIG. 9, it has surprisingly been found that a $Ti_2CS$ phase formed in Examples 1, 2 and 3, but not in Example 4. It is thought that this phase forms by a reaction between the $W_2S$ and the titanium compound matrix materials during the sintering process. This is advantageous, as $Ti_2CS$ also has a low co-efficient of friction with respect to a ferrous workpiece, and so the formation of this phase is not considered to be deleterious to the properties of sintered tools.

DEFINITIONS

As used herein, a "super hard material" is a material having a Vickers hardness of at least about 28 GPa. Diamond and cubic boron nitride (cBN) material are examples of super hard materials.

As used herein, PCBN (polycrystalline cubic boron nitride) material refers to a type of super hard material comprising grains of cubic boron nitride (cBN) dispersed within a matrix comprising metal or ceramic. PCBN is an example of a super hard material.

As used herein, a "PCBN structure" comprises a body of PCBN material.

A "binder material" is understood to mean a matrix material that wholly or partially fills pores, interstices or interstitial regions within a polycrystalline structure.

A multi-modal size distribution of a mass of grains is understood to mean that the grains have a size distribution with more than one peak, each peak corresponding to a respective "mode". Multimodal polycrystalline bodies may be made by providing more than one source of a plurality of grains, each source comprising grains having a substantially different average size, and blending together the grains or particles from the sources. In one embodiment, a PCBN structure may comprise CBN grains having a multimodal distribution.

The term "substrate" as used herein means any substrate over which the ultra-hard material layer is formed. For example, a "substrate" as used herein may be a transition layer formed over another substrate.

While this invention has been particularly shown and described with reference to embodiments, it will be understood by those skilled in the art that various changes in form and detail may be made without departing from the scope of the invention as defined by the appended claims. For example, although all of the examples use cBN as the superhard phase, it will be appreciated that the same techniques may be used for other types of superhard materials, such as diamond.

Furthermore, the examples above refer to using $WS_2$ as the lubricating material, but it will be appreciated that other types of lubricating material may be used, depending on the expected conditions such as temperature and load during a machining operation.

The invention claimed is:

1. A sintered polycrystalline body comprising:
a plurality of particles of cubic boron nitride dispersed in a matrix, the matrix comprising materials selected from the group consisting of titanium carbonitride, titanium carbide, titanium nitride, titanium diboride, aluminum nitride and aluminum oxide;
wherein the polycrystalline body comprises 0.1 to 5.0 volume % of lubricating chalcogenide particles dispersed in the matrix, the chalcogenide particles selected from the group consisting of tungsten disulphide, tantalum disulphide and molybdenum disulphide,
wherein the sintered polycrystalline body further comprises titanium carbosulfide ($TiCS_2$), and
wherein the chalcogenide particles have a coefficient of friction of less than 0.1 with respect to a ferrous material.

2. The sintered polycrystalline body according to claim 1, wherein the polycrystalline body comprises from 30 to 70 volume % cubic boron nitride.

3. The sintered polycrystalline body according to claim 1, further comprising a substrate, wherein the matrix material is bonded to the substrate at an interface.

4. The sintered polycrystalline body according to claim 3, wherein the substrate comprises tungsten carbide.

5. A tool comprising a sintered polycrystalline body according to claim 1, the tool being for any of cutting, milling, grinding, drilling, or other abrasive applications.

6. A method of making a sintered polycrystalline body comprising:
mixing a plurality of particles of cubic boron nitride with a matrix precursor material, the matrix precursor material comprising compounds for forming a compound selected from the group consisting of titanium carbonitride, titanium carbide, titanium nitride, titanium diboride, aluminum nitride and aluminum oxide;
the sintered polycrystalline body further comprising titanium carbosulfide ($TiCS_2$);
the matrix precursor material further comprising chalcogenide particles, the chalcogenide particles selected from the group consisting of tungsten disulphide, tantalum disulphide and molybdenum disulphide, and having a coefficient of friction of less than 0.1 with respect to a ferrous material, wherein the chalcogenide particles from 0.1 to 5.0 volume % of the combined superhard material particles and the matrix precursor material particles;
consolidating and sintering the plurality of particles of cubic boron nitride and the particles of matrix precursor material at a pressure of between 4 GPa and 8 GPa and a temperature of between 1100° and 1600° C.

7. The method according to claim 6, further comprising consolidating and sintering the plurality of particles of superhard material and the particles of matrix precursor material at a pressure of between 4 GPa and 6 GPa and a temperature of between 1200° and 1450° C.

8. The method according to claim 6, wherein the sintered polycrystalline body comprises from 30 to 70 volume % cubic boron nitride.

9. The method according to claim 6, further comprising providing a substrate precursor material, and consolidating and sintering the plurality of particles of cubic boron nitride and the particles of matrix precursor material onto the substrate precursor material, thereby forming a sintered polycrystalline body bonded to a substrate along an interface.

10. The method of claim 9, wherein the substrate comprises tungsten carbide.

* * * * *